No. 898,088. PATENTED SEPT. 8, 1908.
D. C. BOYD.
CULVERT.
APPLICATION FILED MAR. 4, 1908.
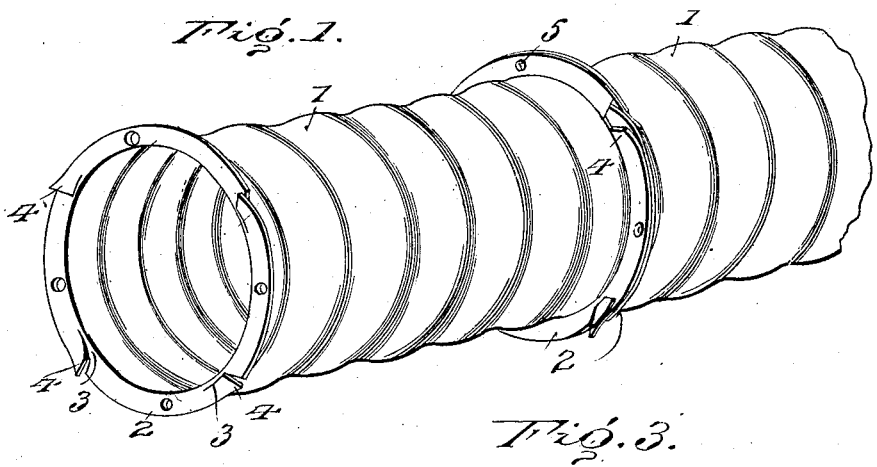
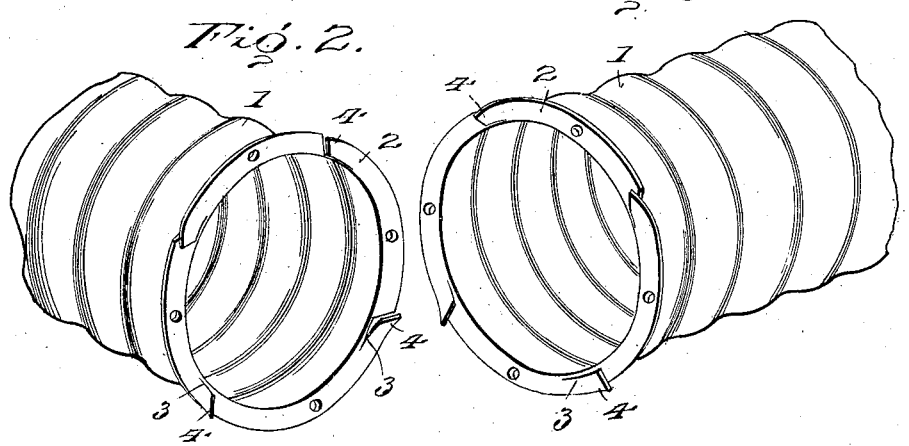
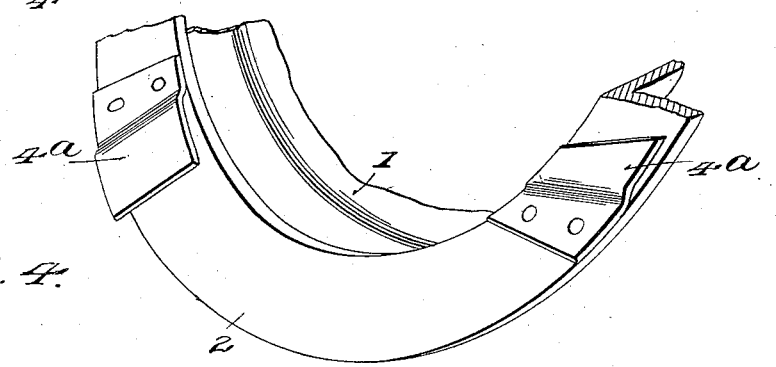
Inventor
D. C. Boyd
Witnesses
By
Attorneys

UNITED STATES PATENT OFFICE.

DAVID C. BOYD, OF GALION, OHIO.

CULVERT.

No. 898,088.     Specification of Letters Patent.     Patented Sept. 8, 1908.

Application filed March 4, 1908. Serial No. 419,125.

*To all whom it may concern:*

Be it known that I, DAVID C. BOYD, citizen of the United States, residing at Galion, in the county of Crawford and State of Ohio, have invented certain new and useful Improvements in Culverts, of which the following is a specification.

This invention comprehends certain new and useful improvements in sheet metal culverts, and the invention has for its object a simple, durable, and efficient construction of culvert section arranged to interlock in a peculiar manner with an adjoining section to form the complete culvert, the said joint being effected in an easy and inexpensive manner, requiring no extra material of any kind and holding the sections together effectively.

With this and other objects in view as will more fully appear as the description proceeds, the invention consists in certain constructions and arrangements of the parts that I shall hereinafter fully describe and claim.

For a full understanding of the invention, reference is to be had to the following description and accompanying drawings, in which:

Figure 1 is a perspective view of two sections of a culvert constructed in accordance with my invention; Figs. 2 and 3 are similar views of portions of the adjoining ends of two culvert sections; Fig. 4 is a fragmentary perspective view of a portion of one section illustrating a modification.

Corresponding and like parts are referred to in the following description and indicated in all the views of the drawings by the same reference characters.

Each section 1 of my improved culvert is formed of sheet metal and rolled into cylindrical shape, the edges being overlapped and riveted, or secured together in any other desired way. Each section 1 is also preferably corrugated, although my invention is manifestly not limited to a corrugated culvert section and said corrugations in the present instance extend transversely or circumferentially, as clearly illustrated in the drawings.

Flanges 2 are formed on the ends of the culvert sections 1, the said flanges projecting outwardly as shown and being preferably slitted at predetermined intervals, as indicated at 3, the material bounding one side of the slit being offset outwardly, as shown, so as to form a tongue 4. As clearly illustrated in the drawing, the tongues on abutting or adjoining flanges face in opposite direction and are designed to be interlocked so as to form a complete culvert of the desired length, by merely giving one section a partial turn, so as to cause the tongues to engage with the tongues of the adjacent section. If desired, bolts 5 may also be used to secure two adjoining flanges together, in order to prevent the uncoupling of the said sections by any accidental or partial rotation of either of them, but it is to be understood that my invention is not limited to the use of bolts as connecting means, the tongues themselves in their interlocking connection being sufficient to maintain a secure joint in practically all conditions.

While I prefer that the tongues be formed out of the metal of the flanges themselves, it is obvious that they may be formed separately, riveted or otherwise secured to the flanges, as indicated at $4^a$, in Fig. 4.

From the foregoing description in connection with the accompanying drawing, it will be seen that I have provided a culvert section that is formed with means whereby it may be easily connected to a similar and adjoining section merely by imparting a slight rotation to one section relative to the other, and that after once being secured together with the tongues interlocking, an effective coupling connection is established.

It is to be understood that my invention is not limited to the exact form, shape, or construction of locking tongues illustrated in the accompanying drawing, and I have illustrated in Fig. 4 one of the various modifications to which my invention is susceptible and which will readily suggest themselves to those skilled in the art to which this invention appertains.

It is to be understood that the outstanding flanges may be formed either as integral parts of the culvert section or as separate parts bolted, riveted, or otherwise secured to the sections.

Having thus described the invention, what is claimed as new is:

1. A culvert section provided with an outstanding end flange, and tongues offset from said flange, as and for the purpose set forth.

2. A culvert section provided with an end flange, said flange being formed with a plurality of slits, and the metal at one side of said slits being offset whereby to form a plurality of locking tongues.

3. The combination of two abutting culvert sections formed at their adjoining ends with flanges and with interlocking tongues offset from said flanges, the tongues of one flange facing in the opposite direction from those of the adjoining flange, the tongues of the respective flanges being interlocked, substantially as set forth.

4. The combination of two abutting culvert sections formed at their adjoining ends with flanges and with interlocking tongues offset from said flanges, the tongues of one flange facing in the opposite direction from those of the adjoining flange, and the tongues of the respective flanges being interlocked, substantially as set forth, and bolts securing said flanges together.

In testimony whereof I affix my signature in presence of two witnesses.

DAVID C. BOYD. [L. S.]

Witnesses:
EVA V. TALBOTT,
P. M. DAILY.